(12) United States Patent
Ota et al.

(10) Patent No.: US 8,518,585 B2
(45) Date of Patent: Aug. 27, 2013

(54) METHOD FOR PRODUCING LITHIUM ION CONDUCTIVE SOLID ELECTROLYTE

(75) Inventors: Tsuyoshi Ota, Sodegaura (JP); Minoru Senga, Sodegaura (JP); Shigeo Matsuzaki, Sodegaura (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 585 days.

(21) Appl. No.: 12/678,162

(22) PCT Filed: Sep. 22, 2008

(86) PCT No.: PCT/JP2008/067126
§ 371 (c)(1),
(2), (4) Date: Mar. 15, 2010

(87) PCT Pub. No.: WO2009/047977
PCT Pub. Date: Apr. 16, 2009

(65) Prior Publication Data
US 2010/0200795 A1 Aug. 12, 2010

(30) Foreign Application Priority Data

Oct. 11, 2007 (JP) ................................. 2007-265523

(51) Int. Cl.
*H01M 6/16* (2006.01)

(52) U.S. Cl.
USPC .......................................... 429/324; 429/326

(58) Field of Classification Search
USPC .................................................... 429/324, 326
See application file for complete search history.

(56) References Cited

FOREIGN PATENT DOCUMENTS

| | | |
|---|---|---|
| JP | 10-321256 | 12/1998 |
| JP | 11-144523 | 5/1999 |
| WO | WO 2004/093099 A1 | 10/2004 |
| WO | WO 2005/119706 A1 | 12/2005 |

*Primary Examiner* — Edward Cain
(74) *Attorney, Agent, or Firm* — Oblon, Spivak, McClelland, Maier & Neustadt, L.L.P.

(57) ABSTRACT

A method for producing a lithium ion conductive solid electrolyte including the step of bringing one or more compounds selected from phosphorous sulfide, germanium sulfide, silicon sulfide and boron sulfide into contact with lithium sulfide in a hydrocarbon-based solvent.

26 Claims, No Drawings

METHOD FOR PRODUCING LITHIUM ION CONDUCTIVE SOLID ELECTROLYTE

This application is a 371 of PCT/JP08/67126 filed Sep. 22, 2008. Priority to Japanese patent application 2007-265523, filed Oct. 11, 2007 is claimed.

TECHNICAL FIELD

The invention relates to a method for producing a lithium ion conductive solid electrolyte. More particularly, the invention relates to a method for producing a lithium ion conductive solid electrolyte advantageously on the industrial scale at a relatively low temperature without using special equipment.

BACKGROUND ART

In recent years, there has been an increasing demand for a lithium battery which is utilized as the primary power source of mobile terminals, mobile electronics, household small-sized power storage apparatus, and motor-driven vehicles such as two-wheel automatic cars and hybrid electric cars, or the like.

Since many of solid electrolytes used in lithium batteries contain combustible organic substances, ignition or the like may happen when abnormality occurs in batteries. Under such circumstances, ensuring safety of batteries has been demanded. In addition, in order to improve reliability against impact or oscillation, to further improve energy density, as well as to meet strong social requirements for establishing a highly efficient energy conversion system which does not contaminate the earth, development of all-solid lithium secondary batteries using a solid electrolyte composed of a non-combustible solid material is desired.

As the non-combustible solid electrolyte, a sulfide-based solid electrolyte has been studied. Examples of the production method thereof include a method in which a raw material is treated at high temperatures under vacuum or in an inert atmosphere and a method in which mechanical milling is conducted at room temperature by using a planetary ball mill. However, none of these methods is suited to mass production due to the need of special equipment.

To respond to these problems, the inventors have proposed a method in which a lithium ion conductive solid electrolyte can be produced advantageously on the industrial scale at a relatively low temperature without using special equipment by allowing raw materials to react in an organic solvent (see Patent Document 1). Specifically, N-methyl-2-pyrrolidone or the like is used as a non-protonic organic solvent, and lithium sulfide and phosphorous sulfide are reacted in the solvent as a homogenous solution.

However, among non-protonic organic solvents, solvents which have a relatively strong polarity such as N-methyl-2-pyrrolidone easily dissolve phosphorous sulfide, and hence they become a factor of increasing reactivity. However, due to the strong solvating power with lithium, they tend to remain in lithium sulfide products.

According to the technology of Patent Document 1, it is possible to realize prescribed ion conductivity by removing residual N-methyl-2-pyrrolidone almost perfectly. However, by this method, the prescribed ion conductivity cannot be attained satisfactorily. It has a problem that the production process is prolonged since a generated solid electrolyte is required to be washed by using a non-polar solvent or the solvent has to be distilled off a number of times under a reduced pressure.

Further, if a polar solvent such as N-methyl-2-pyrrolidone remains in a product when the solvent is distilled off by a normal method, significant lowering in ion conductivity occurs, and hence, improvement is needed to ensure stable product supply. In addition, if the temperature at which a polar solvent is distilled off is too high, ion conductivity of a solid electrolyte may be lowered due to a reaction with a solvent.

A residual polar solvent may cause lowering of battery performance and cell corrosion. Therefore, it is necessary to remove it as perfectly as possible. Further, since a special solvent such as N-methyl-2-pyrrolidone is expensive, a solvent which is not only effective but also inexpensive has been desired.

Patent Document 2 discloses a method for producing a solid electrolyte in which raw material mixed powder is treated at a relatively low temperature by means of special equipment such as a tumbling mill. This method suffers from problems that it needs special equipment and that production efficiency is lowered due to adhesion of raw material powder to the wall of an apparatus.

Patent Document 1: WO/2004/093099
Patent Document 2: JP-A-H11-144523

The object of the invention is to provide a method for producing a lithium ion conductive solid electrolyte easily without using special equipment.

DISCLOSURE OF THE INVENTION

In the production of a solid electrolyte using an organic solvent, to improve reactivity, it is desirable to increase the solubility of raw materials. In order to increase the reactivity, it is preferable to use a solvent with a high polarity. A solvent with a high degree of polarity tends to remain in a final product, thereby to degrade the performance of the resulting solid electrolyte. Under such contradicting conditions, the inventors have found that, by using a hydrocarbon-based solvent as a solvent, reactivity can be maintained and the amount of a solvent remaining in the final product can be reduced. The invention has been made based on this finding.

According to the invention, the following method for producing a lithium ion conductive solid electrolyte is provided.
1. A method for producing a lithium ion conductive solid electrolyte comprising the step of bringing one or more compounds selected from phosphorous sulfide, germanium sulfide, silicon sulfide and boron sulfide into contact with lithium sulfide in a hydrocarbon-based solvent.
2. The method for producing a lithium ion conductive solid electrolyte according to 1, wherein the contact temperature in the hydrocarbon-based solvent is 80° C. or higher and 300° C. or lower.
3. The method for producing a lithium ion conductive solid electrolyte according to 1 or 2, wherein the solid electrolyte obtained by the contact process is further subjected to a heat treatment at a temperature of 200° C. or higher and 400° C. or lower.
4. The method for producing a lithium ion conductive solid electrolyte according to any of claims 1 to 3 wherein the average particle size of the lithium sulfide is 10 μm or less.

According to the invention, a lithium ion conductive solid electrolyte can be produced easily for a short period of time without using special equipment or a special solvent.

BEST MODE FOR CARRYING OUT THE INVENTION

The method for producing a lithium ion conductive solid electrolyte according to the invention includes a step in which one or more compounds selected from phosphorous sulfide, germanium sulfide, silicon sulfide and boron sulfide are brought into contact with lithium sulfide in a hydrocarbon-based solvent.

There are no particular restrictions on phosphorous sulfide, germanium sulfide, silicon sulfide and boron sulfide, and commercial products thereof can be used. Of these, phosphorous sulfide is preferable. Among phosphorous sulfide, phosphorus pentasulfide is further preferable.

Lithium sulfide used in the invention can be synthesized by a method disclosed in Japanese Patent No. 3528866, for example. In particular, it is preferable to use lithium sulfide which is synthesized by a method disclosed in WO/2005/040039, which has a purity of 99% or more.

It is preferred that the average particle size of lithium sulfide be reduced to 10 μm or less in advance by subjecting lithium sulfide to a treatment such as pulverization. An average particle size of 5 μm or less is particularly preferable. If the average particle size is small, the reaction time can be shortened, and the conductivity of the resulting solid electrolyte can be easily improved.

As the hydrocarbon-based solvent, a saturated hydrocarbon, unsaturated hydrocarbon or aromatic hydrocarbon can be used.

Examples of the saturated hydrocarbon include hexane, pentane, 2-ethylhexane, heptane, decane and cyclohexane.

Examples of the unsaturated hydrocarbon include hexene, heptene and cyclohexene.

Examples of the aromatic hydrocarbon include toluene, xylene, decaline and 1,2,3,4-tetrahydronaphthalene.

Of these, toluene and xylene are particularly preferable.

It is preferred that the hydrocarbon-based solvent be dehydrated in advance. Specifically, a water content of 100 wt ppm or less is preferable, with 30 wt ppm or less being particularly preferable.

According to need, other solvents may be added to the hydrocarbon-based solvent. Specific examples thereof include ketones such as acetone and methyl ethyl ketone, ethers such as tetrahydrofuran, alcohols such as ethanol and butanol, esters such as ethyl acetate, halogenated hydrocarbons such as dichloromethane and chlorobenzene.

In the invention, one or more compounds selected from phosphorous sulfide, germanium sulfide, silicon sulfide and boron sulfide (hereinafter may be abbreviated to compound A) are brought into contract with lithium sulfide in a hydrocarbon-based solvent.

The amount of lithium sulfide is preferably 30 to 95 mol % relative to the total of lithium sulfide and compound A, with 40 to 90 mol % being further preferable. 50 to 85 mol % is particularly preferable.

It is preferred that the amount of the hydrocarbon-based solvent be such that lithium sulfide and compound A take the form of a solution or a slurry by the addition of a solvent. Normally, the added amount (total amount) of the raw material per liter of the solvent is around 0.001 to 1 kg. Preferably, the added amount is preferably 0.005 to 0.5 kg, with 0.01 to 0.3 kg being particularly preferable.

Lithium sulfide is brought into contact with compound A in the hydrocarbon-based solvent. At this time, the temperature is normally 80 to 300° C., preferably 100 to 250° C., more preferably 100 to 200° C. Normally, the time is 5 minutes to 50 hours, preferably 10 minutes to 40 hours.

The temperature and the time may be combined based on several conditions.

It is preferred that stirring be conducted when the raw materials are brought into contact with each other under an atmosphere of an inert gas such as nitrogen and argon. The dew point of an inert gas is preferably −20° C. or less, particularly preferably −40° C. or less. Generally, the pressure is from normal pressure to 100 MPa, preferably from normal pressure to 20 MPa.

After the contact treatment, the solid matters generated and the solvent are separated, thereby to collect the solid electrolyte. Separation may be conducted by a known method such as decantation, filtration, drying or a combination thereof.

In the invention, it is preferred that the solid electrolyte obtained in the above-mentioned contact process be subjected to a heat treatment at a temperature of 200° C. or higher and 400° C. or lower, more preferably at a temperature of 230° C. to 350° C. As a result, the ion conductivity of the solid electrolyte is improved.

The heat treatment time is preferably 0.1 to 24 hours, with 0.5 to 12 hours being particularly preferable.

It is preferred that the heat treatment be conducted under an atmosphere of an inert gas such as nitrogen and argon. The dew point of the inert gas is preferably −20° C. or less, with −40° C. or less being particularly preferable. The pressure is normally from a reduced pressure to 20 MPa. It is preferred that drying under reduced pressure be conducted or that an inert gas be circulated at normal pressure.

In the production method according to the invention, since the raw materials are brought into contact with each other in a hydrocarbon-based solvent, a solid electrolyte can be produced in general-purpose equipment such as a reaction chamber or an autoclave which are commonly used. That is, special equipment such as equipment which withstands high temperatures and a ball mill becomes unnecessary.

Further, by using a hydrocarbon-based solvent, the amount of a solvent which remains in the solid electrolyte can be reduced. As a result, a solid electrolyte with stable ion conductivity can be produced without conducting a treatment of removing a residual solvent such as washing.

EXAMPLES

Example 1

The inside of a flask equipped with a stirrer was replaced with nitrogen. The flask was then charged with 1.55 g of lithium sulfide with an average particle size of 4 μm (produced by Idemitsu Kosan, Co., Ltd.), 3.46 g of phosphorus pentasulfide (produced by Sigma-Aldrich Corporation) and 50 ml of xylene with a water content of 10 ppm (produced by Wako Pure Chemicals Industries, Co. Ltd.). These raw materials were brought into contact with each other at 140° C. for 24 hours.

Solid matters were separated by filtration, and dried under vacuum at 120° C. for 40 minutes, whereby a solid electrolyte was produced. The ion conductivity of the resulting solid electrolyte was $2.2 \times 10^{-6}$ S/cm. As a result of an X-ray diffraction analysis (CuKα:λ=1.5418⊢), no other peaks were observed than a halo pattern derived from an amorphous structure. Accordingly, the resulting product was confirmed to be solid electrolyte glass.

The particle size of lithium sulfide was measured by means of a laser diffraction-type particle size distribution measuring apparatus LMS-30 (produced by Seishin Enterprise Co., Ltd.).

The ion conductivity was measured according to the following method.

The solid electrolyte was charged in a tableting machine, and pressed by applying a pressure of 4 to 6 MPa to obtain a molded product. Further, as an electrode, a mixed material obtained by mixing carbon and the solid electrolyte at a weight ratio of 1:1 was put on the both sides of the molded product. A pressure was applied again by means of the tableting machine to produce a molded product for measuring conductivity (diameter: about 10 mm, thickness: about 1 mm). Using this molded product, the ion conductivity was measured by the alternate impedance measurement method. As for the value of the conductivity, a value at 25° C. was used.

Example 2

The solid electrolyte produced in Example 1 was further subjected to a heat treatment in a nitrogen atmosphere at 300° C. for 5 hours.

The ion conductivity of the solid electrolyte after the heat treatment was $2.1 \times 10^{-4}$ S/cm.

As a result of the X-ray diffraction analysis, slight peaks were observed at 2θ=17.8, 18.2, 19.8, 21.8, 23.8, 25.9, 29.5 and 30.0 deg, and it was confirmed that the resulting product was solid electrolyte glass ceramics.

Example 3

A solid electrolyte was produced in the same manner as in Example 1, except that, as lithium sulfide, lithium sulfide with an average diameter of 0.3 μm which had been pulverized in advance by means of a jet mill (produced by Aishin Nano Technologies Co., Ltd.) was used. The ion conductivity of this solid electrolyte was found to be $2.0 \times 10^{-5}$ S/cm. As a result of an X-ray diffraction analysis (CuKα:λ=1.5418–), no other peaks were observed than a halo pattern derived from an amorphous structure. Accordingly, the resulting product was confirmed to be solid electrolyte glass.

Example 4

The solid electrolyte produced in Example 3 was further subjected to a heat treatment at 300° C. for 5 hours. The ion conductivity of the solid electrolyte after the heat treatment was $8.2 \times 10^{-4}$ S/cm. As a result of the X-ray diffraction analysis, peaks were observed at 2θ=17.8, 18.2, 19.8, 21.8, 23.8, 25.9, 29.5 and 30.0 deg, and it was confirmed that the resulting product was the solid electrolyte glass ceramics.

Example 5

An autoclave equipped with a stirrer, the inside of which had been replaced with nitrogen, was charged with 1.55 g of the lithium sulfide with an average particle size of 0.3 μm (produced by Idemitsu Kosan, Co., Ltd.), 3.46 g of phosphorus pentasulfide and 50 ml of toluene with a moisture content of 7 ppm (produced by Wako Pure Chemicals Industries, Co. Ltd.) which had been pulverized in advance by means of a jet mill (produced by Aishin Nano Technologies, Co., Ltd.). These raw materials were brought into contact with each other at 190° C. for 24 hours.

Then, solid matters were separated by filtration, and dried under vacuum at 150° C. for 120 minutes, whereby a solid electrolyte was produced.

The ion conductivity of the resulting solid electrolyte was $4.0 \times 10^{-4}$ S/cm. As a result of an X-ray diffraction analysis (CuKα:λ=1.5418–), no other peaks were observed than a halo pattern derived from an amorphous structure. Accordingly, the resulting product was confirmed to be solid electrolyte glass.

Example 6

The solid electrolyte produced in Example 5 was further subjected to a heat treatment at 300° C. for 5 hours. The ion conductivity after the heat treatment was $1.1 \times 10^{-3}$ S/cm. As a result of the X-ray diffraction analysis, peaks were observed at 2θ=17.8, 18.2, 19.8, 21.8, 23.8, 25.9, 29.5 and 30.0 deg, and it was confirmed that the resulting product was solid electrolyte glass ceramics.

Example 7

A solid electrolyte was produced in the same manner as in Example 5, except that hexane of which the moisture content was reduced to 6 ppm was used as the solvent instead of toluene, that the contact temperature was changed to 78° C. and the contact time was changed to 48 hours. The ion conductivity of this solid electrolyte was $6.5 \times 10^{-5}$ S/cm. After a further heat treatment at 30° C. for 5 hours, the ion conductivity of this solid electrolyte was $3.3 \times 10^{-4}$ S/cm. As a result of the X-ray diffraction analysis, peaks were observed at 2θ=17.8, 18.2, 19.8, 21.8, 23.8, 25.9, 29.5 and 30.0 deg, and it was confirmed that the resulting product was solid electrolyte glass ceramics.

Example 8

A solid electrolyte was produced in the same manner as in Example 7, except that the contact temperature and the contact time were changed to 88° C. and 40 hours, respectively. The ion conductivity of this solid electrolyte was $7.7 \times 10^{-5}$ S/cm. After a further heat treatment at 300° C. for 5 hours, the ion conductivity of this solid electrolyte was $5.3 \times 10^{-4}$ S/cm. As a result of the X-ray diffraction analysis, peaks were observed at 2θ=17.8, 18.2, 19.8, 21.8, 23.8, 25.9, 29.5 and 30.0 deg, and it was confirmed that the resulting product was solid electrolyte glass ceramics.

Example 9

A solid electrolyte was produced in the same manner as in Example 5, except that decane of which the moisture content was reduced to 5 ppm was used as the solvent instead of toluene, the contact temperature was changed to 250° C. and the contact time was changed to 12 hours, and that the vacuum drying temperature was changed to 180° C. The ion conductivity of this solid electrolyte was $6.2 \times 10^{-5}$ S/cm. After a further heat treatment at 300° C. for 5 hours, the ion conductivity of this solid electrolyte was $9.5 \times 10^{-4}$ S/cm.

Example 10

A solid electrolyte was produced in the same manner as in Example 1, except that, as the lithium sulfide, lithium sulfide with an average diameter of 12 μm (produced by Sankyo Kasei Co., Ltd.) was used. The ion conductivity of this solid electrolyte was found to be $1.4 \times 10^{-6}$ S/cm. As a result of an X-ray diffraction analysis (CuKα:λ=1.5418–), no other peaks were observed than a halo pattern derived from an amorphous structure. Accordingly, the resulting product was confirmed to be solid electrolyte glass. After a heat treatment in a nitrogen atmosphere at 300° C. for 5 hours, the ion conductivity of this solid electrolyte was $1.2 \times 10^{-5}$ S/cm.

As a result of the X-ray diffraction analysis, slight peaks were observed at 2θ=17.8, 18.2, 19.8, 21.8, 23.8, 25.9, 29.5 and 30.0 deg, and it was confirmed that the resulting product was solid electrolyte glass ceramics.

Example 11

A solid electrolyte was produced in the same manner as in Example 1, except that, as the lithium sulfide, lithium sulfide with an average diameter of 8 µm (produced by Sankyo Kasei Co., Ltd.) was used. The ion conductivity of this solid electrolyte was found to be $3.1 \times 10^{-6}$ S/cm. After a heat treatment in a nitrogen atmosphere at 300° C. for 5 hours, the ion conductivity of this solid electrolyte was $9.5 \times 10^{-6}$ S/cm.

As a result of the X-ray diffraction analysis, slight peaks were observed at $2\theta=17.8, 18.2, 19.8, 21.8, 23.8, 25.9, 29.5$ and 30.0 deg, and it was confirmed that the resulting product was solid electrolyte glass ceramics.

Comparative Example 1

The inside of a flask equipped with a stirrer was replaced with nitrogen. The flask was then charged with 1.55 g of lithium sulfide with an average particle size of 4 µm, 3.46 g of phosphorus pentasulfide and 50 ml of N-methyl-2-pyrrolidone with a moisture content of 5 ppm (produced by Wako Pure Chemicals Industries, Co. Ltd.). These raw materials were brought into contact with each other at 140° C. for 24 hours.

Thereafter, solid matters were separated by filtration, and dried under vacuum at 150° C. for 120 minutes. The ion conductivity of the resulting solid electrolyte was $3.7 \times 10^{-7}$ S/cm. As a result of an X-ray diffraction analysis (CuKα: $\lambda=1.5418$), no other peaks were observed than a halo pattern derived from an amorphous structure. Accordingly, the resulting product was confirmed to be solid electrolyte glass.

After a heat treatment at 300° C. for 5 hours, the ion conductivity of this solid electrolyte was $3.4 \times 10^{-6}$ S/cm.

INDUSTRIAL APPLICABILITY

According to the production method of the invention, a lithium ion conductive solid electrolyte can be produced at a relatively low temperature without using special equipment.

The invention claimed is:

1. A method for producing a lithium ion conductive solid electrolyte comprising bringing one or more compounds selected from phosphorous sulfide, germanium sulfide, silicon sulfide and boron sulfide into contact with lithium sulfide in a hydrocarbon-based solvent.

2. The method for producing a lithium ion conductive solid electrolyte according to claim 1, wherein the contact temperature in the hydrocarbon-based solvent is 80° C. or higher and 300° C. or lower.

3. The method for producing a lithium ion conductive solid electrolyte according to claim 1, wherein the solid electrolyte obtained by the contact process is further subjected to a heat treatment at a temperature of 200° C. or higher and 400° C. or lower.

4. The method for producing a lithium ion conductive solid electrolyte according to claim 1, wherein the average particle size of the lithium sulfide is 10 µm or less.

5. The method for producing a lithium ion conductive solid electrolyte according claim 1, wherein the average particle size of the lithium sulfide is 5 µm or less.

6. The method for producing a lithium ion conductive solid electrolyte according claim 1, comprising bringing phosphorous sulfide into contact with lithium sulfide, wherein the phosphorous sulfide is phosphorous pentasulfide.

7. The method for producing a lithium ion conductive solid electrolyte according claim 1, wherein the hydrocarbon-based solvent is a saturated hydrocarbon, an unsaturated hydrocarbon, or an aromatic hydrocarbon.

8. The method for producing a lithium ion conductive solid electrolyte according claim 1, wherein the hydrocarbon-based solvent is a saturated hydrocarbon selected from the group consisting of hexane, pentane, 2-ethylhexane, heptane, decane and cyclohexane.

9. The method for producing a lithium ion conductive solid electrolyte according claim 1, wherein the hydrocarbon-based solvent is an unsaturated hydrocarbon selected from the group consisting of hexane, heptene and cyclohexene.

10. The method for producing a lithium ion conductive solid electrolyte according claim 1, wherein the hydrocarbon-based solvent is an aromatic hydrocarbon selected from the group consisting of toluene, xylene, decaline, and 1,2,3,4-tetrahydronaphthalene.

11. The method for producing a lithium ion conductive solid electrolyte according claim 1, wherein the hydrocarbon-based solvent is toluene or xylene.

12. The method for producing a lithium ion conductive solid electrolyte according claim 1, wherein the hydrocarbon-based solvent has a water content of 100 wt ppm or less.

13. The method for producing a lithium ion conductive solid electrolyte according claim 1, wherein the hydrocarbon-based solvent further comprises at least one other solvent selected from the group consisting of a ketone, an ether, and alcohol, an ester, and a halogenated hydrocarbon.

14. The method for producing a lithium ion conductive solid electrolyte according claim 1, wherein the lithium sulfide is present in an amount of from 30 to 95 mol % relative to the total amount of lithium sulfide, phosphorous sulfide, germanium sulfide, silicon sulfide, and boron sulfide.

15. The method for producing a lithium ion conductive solid electrolyte according claim 1, wherein the lithium sulfide and one or more compounds selected from phosphorous sulfide, germanium sulfide, silicon sulfide, and boron sulfide, take a form of a solution or slurry in the hydrocarbon-based solvent.

16. The method for producing a lithium ion conductive solid electrolyte according claim 1, wherein the amount of said lithium sulfide and said one or more compounds selected from phosphorous sulfide, germanium sulfide, silicon sulfide, and boron sulfide in said solvent is 0.001 to 1 kg per liter of solvent.

17. The method for producing a lithium ion conductive solid electrolyte according claim 1, comprising bringing phosphorous sulfide into contact with lithium sulfide in a hydrocarbon-based solvent.

18. The method for producing a lithium ion conductive solid electrolyte according to claim 1, wherein the lithium sulfide is subjected to pulverization prior to said contact.

19. The method for producing a lithium ion conductive solid electrolyte according to claim 18, wherein the average particle size of the lithium sulfide is 5 µm or less.

20. The method for producing a lithium ion conductive solid electrolyte according claim 1, wherein the lithium sulfide and one or more compounds selected from phosphorous sulfide, germanium sulfide, silicon sulfide, and boron sulfide, take a form of a slurry in the hydrocarbon-based solvent.

21. The method for producing a lithium ion conductive solid electrolyte according claim 1, comprising bringing phosphorous sulfide into contact with lithium sulfide in a hydrocarbon-based solvent, wherein:
   the lithium sulfide and phosphorous sulfide take a form of a slurry in the hydrocarbon-based solvent;
   the hydrocarbon-based solvent is a saturated hydrocarbon, an unsaturated hydrocarbon, or an aromatic hydrocarbon and has a water content of 100 wt ppm or less;
   the contact temperature in the hydrocarbon-based solvent is 80° C. or higher and 300° C. or lower;

the average particle size of the lithium sulfide is 10 μm or less; and the amount of said lithium sulfide and said phosphorous sulfide in said hydrocarbon-based solvent is 0.001 to 1 kg per liter of solvent.

22. The method for producing a lithium ion conductive solid electrolyte according claim 21, wherein the solid electrolyte obtained by the contact process is further subjected to a heat treatment at a temperature of 200° C. or higher and 400° C. or lower.

23. The method for producing a lithium ion conductive solid electrolyte according claim 21, wherein the phosphorous sulfide is phosphorous pentasulfide.

24. The method for producing a lithium ion conductive solid electrolyte according claim 21, wherein:

the hydrocarbon-based solvent has a water content of 30 wt ppm or less;

the contact temperature in the hydrocarbon-based solvent is 100° C. or higher and 250° C. or lower;

the average particle size of the lithium sulfide is 5 μm or less; and the amount of said lithium sulfide and said phosphorous sulfide in said hydrocarbon-based solvent is 0.01 to 0.3 kg per liter of solvent.

25. The method for producing a lithium ion conductive solid electrolyte according claim 24, wherein the solid electrolyte obtained by the contact process is further subjected to a heat treatment at a temperature of 200° C. or higher and 400° C. or lower.

26. The method for producing a lithium ion conductive solid electrolyte according claim 24, wherein the phosphorous sulfide is phosphorous pentasulfide.

* * * * *